Patented Aug. 9, 1932

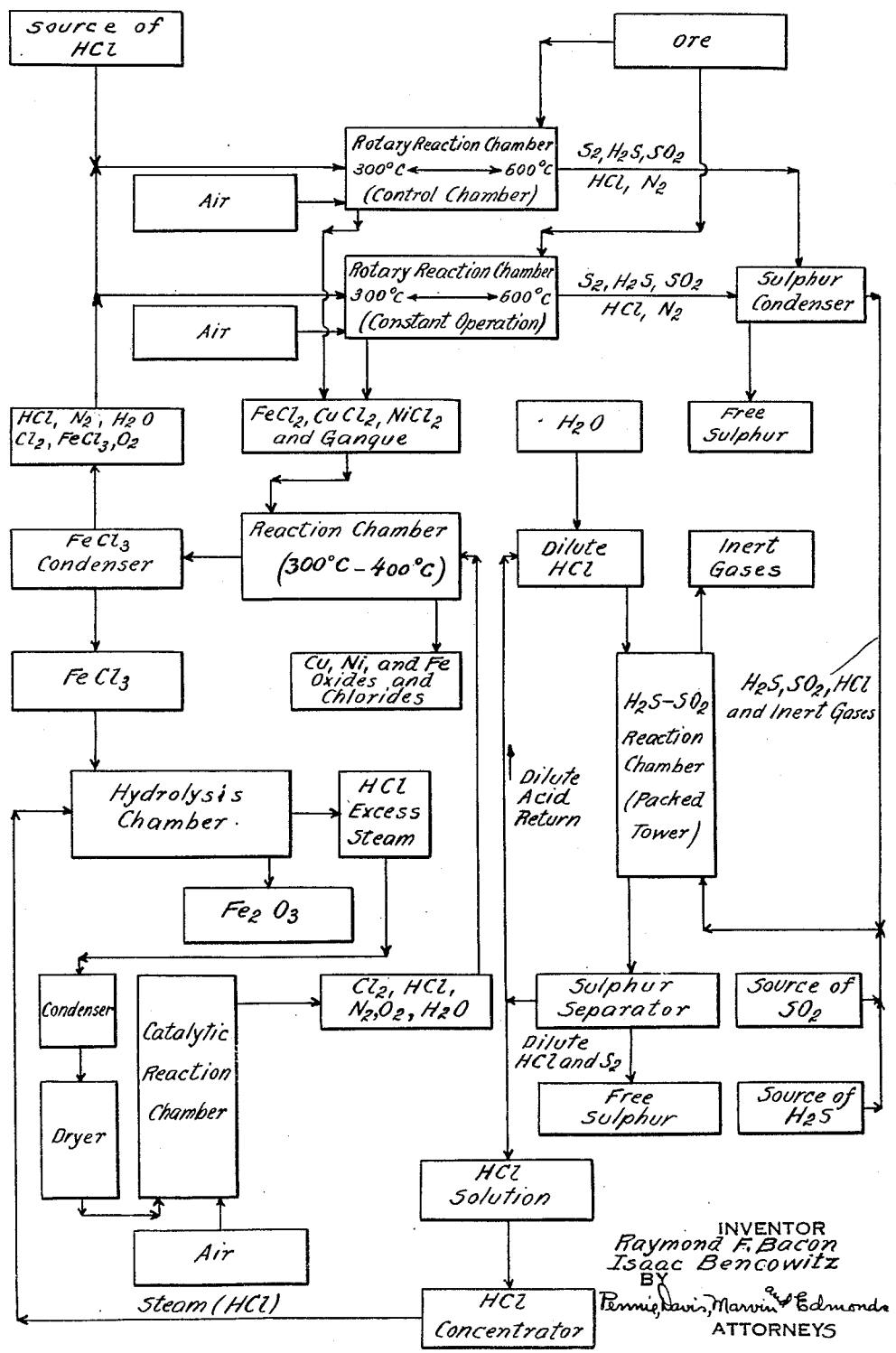

1,870,478

UNITED STATES PATENT OFFICE

RAYMOND F. BACON, OF BRONXVILLE, AND ISAAC BENCOWITZ, OF NEW YORK, N. Y;
SAID BENCOWITZ ASSIGNOR TO SAID BACON

RECOVERY OF SULPHUR

Application filed August 2, 1930. Serial No. 472,693.

This invention relates to the recovery of sulphur and has for an object the provision of an improved process for recovering sulphur from heavy metal sulphide ores. More particularly, the invention contemplates the provision of an improved process for recovering sulphur from materials containing one or more sulphides of iron.

The invention further contemplates the provision of an improved process for treating heavy metal sulphide ores, such, for example, as ore containing sulphides of iron, copper and nickel.

The process of the present invention involves the treatment of ore or other metallurgical raw materials or products containing pyrites or other sulphides of iron, alone or in combination with sulphides of other heavy metals such, for example, as copper and nickel with hydrogen chloride, for the purpose of obtaining free sulphur and/or separating iron from the mass of material undergoing treatment.

According to some heretofore customary practices, pyrites or other iron sulphide bearing materials is subjected to the action of a chlorinating agent under such conditions that ferrous chloride and free sulphur are produced and separated. The ferrous chloride is subjected to the action of chlorine to produce ferric chloride which is subsequently hydrolyzed to produce hydrogen chloride and ferric oxide. The hydrogen chloride produced is dried carefully and subjected to the action of carefully controlled amounts of oxygen in the presence of a suitable catalyst to regenerate chlorine for use in the treatment of additional ferrous chloride.

The heretofore customary processes are carefully controlled to avoid the incorporation of water and oxygen in the gases containing the regenerated chlorine. The operations for regenerating chlorine are carefully controlled to avoid the incorporation of excess oxygen and to achieve a maximum recovery of chlorine. The resulting gases are washed and dried to remove any unconverted hydrogen chloride and water vapor resulting from the reaction.

We have discovered that a reaction between hydrogen chloride and pyrites is promoted when conducted in the presence of water vapor and oxygen and we have therefore found that it is unnecessary to dry and remove hydrogen chloride from the gases resulting from the process for regenerating chlorine.

We have also found that we may conduct the regenerating process inefficiently and obtain a mixture of chlorine, hydrogen chloride, water vapor and oxygen which may be used conveniently for treating ferrous chloride and, subsequently, for treating pyrites or other iron sulphide-bearing material.

The process of the invention involves the treatment of pyrites or other iron sulphide-bearing material with a mixture of gases comprising hydrogen chloride, water vapor and oxygen under such conditions that ferrous chloride and elemental sulphur are formed and separated. The ferrous chloride produced is subjected to the action of a mixture of gases comprising chlorine, hydrogen chloride, oxygen and water vapor which is obtained from a subsequent chlorine regenerating process.

The chlorine of the gas mixture reacts with the ferrous chloride to form ferric chloride which is subjected to the action of steam at an elevated temperature to produce hydrogen chloride and ferric oxide. The hydrogen chloride produced is subjected to the action of air in the presence of a suitable catalyst such, for example, as cupric chloride to produce an amount of chlorine which is sufficient to combine with the ferrous chloride produced during the course of the process to form ferric chloride.

The gases resulting from this operation should be brought into contact with the ferrous chloride in a suitable reaction chamber and the gases issuing from the reaction chamber are utilized for treating additional quantities of pyrites or other iron sulphide-bearing materials. Treatment of the iron pyrites or other iron sulphide-bearing material with such gases results in the production of a mixture of gases comprising elemental sulphur, hydrogen sulphide, sulphur dioxide, hydrogen chloride and nitrogen. This mixture of gases is cooled to condense the elemental sulphur and then treated under such conditions that the hydrogen sulphide and sulphur dioxide contained therein react to produce elemental sulphur and water.

The relative amounts of sulphur dioxide and hydrogen sulphide produced may be controlled by regulating the amount of hydrogen chloride, oxygen and water vapor employed. The process may be so controlled that two molecules of hydrogen sulphide are produced for each molecule of sulphur dioxide, or it may be so controlled that any desired relative amounts of the two compounds may be produced and any additional amount of either compound which may be required, may be supplied from a separate source.

According to the preferred process of the invention, two or more separate operations for the production of mixtures of sulphur dioxide and hydrogen sulphide are conducted simultaneously, and the resulting gases are combined for the purpose of the operation for producing elemental sulphur.

It is difficult to so control a single operation as to produce the theoretical amounts of sulphur dioxide and hydrogen sulphide required for carrying out the reaction for the production of elemental sulphur, but an operation may be readily adjusted to produce mixtures of gases containing fixed proportions of hydrogen sulphide and sulphur dioxide with either in excess. We therefore prefer to conduct two or more separate operations to produce different mixtures of gases containing hydrogen sulphide and sulphur dioxide in different proportions, but all of which may be combined to produce a mixture containing hydrogen sulphide and sulphur dioxide in proper proportions. This procedure permits all of the operations to be conducted continuously without frequent adjustments, or, if the combined gases show a tendency to vary, one of the operations may be utilized for control purposes.

The invention will be better understood from a consideration of the accompanying flowsheet and the following description of a process for treating ore containing pyrites and sulphides of copper and nickel.

The ore to be treated is introduced in a finely divided condition into the interior of two similar rotary reaction chambers each having ore charging means at one end and discharging means at the other end, and which are so constructed and operated that the ore is gradually moved from the charging ends toward the discharge ends. The gases containing hydrogen chloride, oxygen and water vapor are introduced into the reaction chambers at the ends opposite to those at which the ore is introduced and the ore and hydrogen chloride, water vapor and oxygen pass through the reaction chambers in countercurrent relationship, the hydrogen sulphide and sulphur dioxide produced being removed from the reaction chambers at points near the charging ends.

The ore is preferably ground to provide particles sufficiently small to pass a 100-mesh screen in order that intimate contact of the sulphide particles with the air and hydrogen chloride may be obtained. A portion of the water vapor required for the reaction may be provided by introducing the ore into the reaction chamber in a damp, moist, or wet condition.

The reactions involved proceed satisfactorily at a temperature of about 400° C. but they proceed more rapidly and more completely at a temperature of about 550° C. to 600° C. It is, therefore, advisable to maintain a temperature of about 550° C. to 600° C. in at least a portion of each reaction chamber. Such a temperature may be maintained in the charging end portions of the reaction chambers to insure the passage of all issuing gases through zones in which conditions are conducive to a complete and rapid reaction.

The process is preferably so controlled that a temperature of about 550° C. to 600° C. is maintained near the charging ends of the reaction chambers and a temperature of about 300° C. to 400° C. is maintained near the discharge end portions of the reaction chambers.

The hydrogen chloride, water vapor and oxygen are introduced into portions of the reaction chambers which are maintained at a temperature of about 300° C. to 400° C. The hydrogen chloride, water vapor, oxygen and metal sulphides react to produce sulphur dioxide, hydrogen sulphide, ferrous chloride and the chlorides of copper and nickel. The chlorides produced and the gangue materials of the original ore are discharged continuously in the form of a solid residue. Small amounts of hydrogen sulphide and sulphur dioxide react within the reaction chambers to produce elemental sulphur which is vaporized. The gases issuing from the reaction chambers are mixtures comprising hydrogen sulphide, sulphur dioxide, sulphur vapor, nitrogen and small amounts of hydrogen chloride.

One of the reaction chambers is preferably operated under constant conditions with respect to temperature and amounts of ore and reagents introduced. The other reaction chamber is preferably utilized for control purposes and operated under variable controlled conditions. The variable operation is so conducted that the gases from the two chambers may be combined to provide hydrogen sulphide and sulphur dioxide in proper proportions for carrying out a reaction for producing elemental sulphur according to the following equation:

$$2H_2S + SO_2 = 2H_2O + 3S.$$

The mixture of gases is cooled to condense the sulphur vapor contained therein, and the remaining gases are passed in contact with water. For bringing the gases into contact with water the gases and water may be passed in countercurrent relationship through a packed tower. The hydrogen chloride contained in the gases is dissolved in the water to form a dilute solution of hydrochloric acid which promotes a reaction between the hydrogen sulphide and the sulphur dioxide. Elemental sulphur is formed and it may be separated from the hydrochloric acid solution in any suitable manner, as, for example, by settling and decantation or filtering.

It is desirable to form or otherwise provide a solution of hydrochloric acid in the water tower through which the gases containing hydrogen chloride and sulphur dioxide are passed. An acid such as hydrochloric acid reduces any tendency toward the formation of polythionic acids, and assists in precipitation of the elemental sulphur produced by preventing the production of colloidal sulphur. The hydrochloric acid solution produced may be circulated through the packed tower, a portion being withdrawn and water being added constantly to maintain the proper concentration.

The hot residue containing ferrous chloride is subjected to the action of chlorine gas to produce and vaporize ferric chloride. The chlorine gas is contained in a mixture of gases obtained from a subsequent operation designed to produce chlorine from hydrogen chloride. The treatment of the ferrous chloride-bearing material is preferably conducted in a rotary reaction chamber which is so constructed and arranged that material charged into one end portion will move progressively toward the other end portion during its rotation. The ferrous chloride-bearing material and the chlorine gas are preferably introduced into opposite ends of the reaction chamber and pass through the reaction chamber in countercurrent relationship. The ferrous chloride-bearing material thus passes gradually into regions of increasing chlorine concentrations and a substantially complete removal of iron from the mass is assured.

The hot residue contains nickel chloride and copper chloride in addition to ferrous chloride and gangue, and it enters the reaction chamber at a temperature of about 300° C. The chlorine employed for treating the ferrous chloride-bearing material comprises, in part at least, chlorine which is recovered in a subsequent step of the process from ferric chloride produced during the course of the treatment, and it is contaminated with hydrogen chloride, oxygen, water vapor and inert gases. The gases other than chlorine may be utilized for sweeping the ferric chloride from the reaction chamber, and the reaction chamber may, therefore, be maintained at a temperature below the boiling point of ferric chloride. Satisfactory results may be obtained if the reaction chamber is maintained at a temperature of about 300° C., but temperatures above 300° C. and preferably above 315° C., the boiling point of ferric chloride, are more desirable, a temperature of about 350° C. being very satisfactory.

A reaction between ferrous chloride and chlorine proceeds according to the following equation:

$$2FeCl_2 + Cl_2 = 2FeCl_3.$$

The chlorides of nickel and copper remain unchanged and do not vaporize to any substantial extent when a temperature between about 300° C. and 350° C. is maintained.

A residue containing the chlorides of copper and nickel and the gangue contained in the original ore is discharged from the reaction chamber and it may be treated in any desired manner to separate and recover the valuable components.

The gases issuing from the reaction chamber are cooled to condense the ferric chloride and the remaining gases are utilized for treating additional quantities of iron sulphide-bearing material. The condensed ferric chloride is vaporized and subjected to the action of water vapor at an elevated temperature in a suitable reaction chamber. The ferric chloride is hydrolyzed and ferric oxide and hydrogen chloride are formed, the reaction proceeding according to the following equation:

$$2FeCl_3 + 3H_2O = Fe_2O_3 + 6HCl.$$

In carrying out the hydrolysis of ferric chloride, ferric chloride vapor and superheated steam are introduced together into the reaction chamber in such a manner that intimate contact will result. The reaction may be conducted conveniently at a temperature of about 300° C. to 400° C. Good results may be obtained if the reaction chamber is maintained at a temperature of about 350° C.

The ferric oxide will be produced in the form of a fine powder which may be permitted to settle out in the reaction chamber. The gases issuing from the chamber contain hydrogen chloride and water vapor and they may be passed through a condenser and suitable drying apparatus such, for example, as a packed tower having sulphuric acid trickling therethrough to separate the water vapor and produce dry hydrogen chloride.

The dry hydrogen chloride is introduced into a catalytic reaction chamber with one to seven times its volume of air, depending on the concentration of the hydrogen chloride available. The air is preheated to a temperature above 420° C. and preferably to a temperature between 520° C. to 530° C. If desired, the hydrogen chloride may also be preheated.

The catalytic reaction chamber preferably consists of a tower, or a series of communicating towers packed with porous material having a very large surface per unit of volume such, for example, as pumice, brick, cinders and the like. The packing material should be of such a nature that it will be inert to the reagents and the products of the reaction. The packing material is covered or impregnated with the catalyst which promotes a reaction between hydrogen chloride and oxygen, and which may consist of one or more chlorides or sulphates of metals such, for example, as copper and nickel. The salts may be applied as such directly to the packing material or they may be formed in place as, for example, by the action of hydrogen chloride on copper oxide which is distributed throughout the mass. Means are provided for renewing the catalytic mass as its efficiency becomes reduced. For this purpose two towers, or two series of communicating towers, which may be used alternately are preferably provided.

The apparatus is so constructed that the mass of catalyst-bearing material may be maintained at a temperature of from 370° C. to 400° C. The reaction between the hydrogen chloride and the oxygen of the air is exothermic and it may be so controlled as to permit the proper temperature to be maintained. The reaction will proceed at a temperature as low as 205° C., and a temperature as high as 470° C. may be used advantageously. The temperature at which the reaction is conducted will be governed largely by the nature of the catalyst. The temperature employed should be sufficiently low that excessive volatilization of the catalyst is avoided. The reaction involved in this operation does not proceed to completion. The gases issuing from the reaction chamber will consist of a mixture of hydrogen chloride, water vapor, oxygen, nitrogen and chlorine. The reaction is so controlled that the issuing gases contain sufficient chlorine to effect the conversion of the ferrous chloride produced during the process to ferric chloride.

The sulphuric acid used for drying the hydrogen chloride is heated to recover hydrogen chloride which is returned to the process. The sulphuric acid which has been freed from hydrogen chloride is concentrated and again used for drying purposes. A portion of the steam produced in concentrating the sulphuric acid is utilized for treating the ferric chloride. The first fractions obtained during the concentration of the sulphuric acid will contain hydrogen chloride and the use of these fractions in providing superheated steam for treating the ferric chloride will permit an added recovery of chlorine.

As a result of the treatment of the hydrogen chlorine with air, considerable quantities of inert gases, such as nitrogen, are introduced into the system and must be eliminated to avoid excessive dilution. The inert gases will be mixed with the chlorine gas which is recovered, and consequently, they will be returned to the system during the treatment of original ore and during the treatment of the ferrous chloride-bearing residue. Elimination of these gases is effected during the course of the operation for recovering sulphur from the hydrogen sulphide and sulphur dioxide.

The process may be conducted continuously. A source of fresh hydrogen chloride is provided to compensate for losses due to leakage and the production of nickel and copper chlorides.

The principal reactions involved in the process are exothermic and enough heat is provided that no heat need be supplied from outside sources. Heat generated during the course of the process may be utilized for carrying out the concentration of the sulphuric acid, vaporization of ferric chloride and other operations in which temperatures must be increased.

We claim:

1. The method of recovering sulphur from material containing iron sulphide which comprises subjecting the material to the action of hydrogen chloride in the presence of water vapor and oxygen in suitable amount to produce ferrous chloride, hydrogen sulphide and sulphur dioxide, subjecting the ferrous chloride to the action of chlorine to form ferric chloride, hydrolyzing the ferric chloride to recover hydrogen chloride, subjecting the hydrogen chloride to the action of oxygen to generate chlorine from a portion of the hydrogen chloride, utilizing the mixture of gases so produced comprising chlorine and hydrogen chloride as a source of chlorine for the treatment of additional quantities of the ferrous chloride, and returning the residual gases containing the hydrogen chloride to the process.

2. The method of recovering sulphur from material containing iron sulphide which comprises subjecting the material to the action of hydrogen chloride in the presence of water vapor and oxygen in suitable amount to produce ferrous chloride, hydrogen sulphide and sulphur dioxide, subjecting the ferrous chloride to the action of a mixture of gases comprising chlorine and hydrogen chloride to form ferric chloride, subjecting the ferric chloride to the action of water vapor to produce hydrogen chloride, subjecting the hydrogen chloride to the action of air in the presence of a catalyst to form a mixture of gases comprising chlorine and hydrogen chloride, utilizing the mixture of gases thus produced to treat additional quantities of the ferrous chloride, and returning the residual gases containing the hydrogen chloride to the process.

3. The method of recovering sulphur from material containing iron sulphide which comprises subjecting the material to the action of hydrogen chloride in the presence of water vapor and oxygen in suitable amount to produce ferrous chloride, hydrogen sulphide and sulphur dioxide, subjecting the ferrous chloride to the action of chlorine to form ferric chloride, subjecting the ferric chloride to the action of water vapor to produce hydrogen chloride, subjecting the hydrogen chloride to the action of air in the presence of a catalyst to produce a mixture of gases comprising hydrogen chloride, chlorine, oxygen and water vapor, and utilizing the mixture of gases thus produced for the treatment of addition quantities of ferrous chloride and iron sulphide-bearing material.

In testimony whereof we affix our signatures.

RAYMOND F. BACON.
ISAAC BENCOWITZ.